US011217399B2

(12) United States Patent
Kim

(10) Patent No.: US 11,217,399 B2
(45) Date of Patent: Jan. 4, 2022

(54) ELECTROCHEMICAL CAPACITOR AND METHOD OF MANUFACTURING THE SAME

(71) Applicant: LG Chem, Ltd., Seoul (KR)

(72) Inventor: Won-Gon Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/761,292

(22) PCT Filed: Jul. 10, 2019

(86) PCT No.: PCT/KR2019/008498
§ 371 (c)(1),
(2) Date: May 4, 2020

(87) PCT Pub. No.: WO2020/013604
PCT Pub. Date: Jan. 16, 2020

(65) Prior Publication Data
US 2021/0151261 A1    May 20, 2021

(30) Foreign Application Priority Data

Jul. 10, 2018  (KR) .................... 10-2018-0080098

(51) Int. Cl.
*H01G 11/26*    (2013.01)
*H01G 11/10*    (2013.01)
(Continued)

(52) U.S. Cl.
CPC ............ *H01G 11/26* (2013.01); *H01G 11/10* (2013.01); *H01G 11/76* (2013.01); *H01G 11/82* (2013.01);
(Continued)

(58) Field of Classification Search
CPC ...................................................... H01G 11/10
See application file for complete search history.

(56) References Cited

U.S. PATENT DOCUMENTS 6,762,926 B1 * 7/2004 Shiue .................. H01G 4/32
361/502
9,466,429 B1    10/2016 Casanova et al.
(Continued)

FOREIGN PATENT DOCUMENTS

| CN | 101546844 A | 9/2009 |
|----|-------------|--------|
| CN | 103988356 A | 8/2014 |

(Continued)

OTHER PUBLICATIONS

International Search Report for Application No. PCT/KR2019/008498 dated Oct. 29, 2019, 5 pages.
(Continued)

*Primary Examiner* — Eric W Thomas
(74) *Attorney, Agent, or Firm* — Lerner, David, Littenberg, Krumholz & Mentlik, LLP

(57) ABSTRACT

An electrochemical capacitor includes a plurality of electrode assemblies, each including a positive electrode configured in a rolled sheet form and having both surfaces coated with an active material layer, a negative electrode configured in a rolled sheet form to face the positive electrode and having both surfaces coated with an active material layer, a separator interposed and rolled between the positive electrode and the negative electrode, a positive electrode lead wire electrically connected to the positive electrode of each of the plurality of electrode assemblies, and a negative electrode lead wire electrically connected to the negative electrode of each of the plurality of electrode assemblies.

11 Claims, 6 Drawing Sheets

(51) Int. Cl.
*H01G 11/76* (2013.01)
*H01G 11/82* (2013.01)
*H01G 11/12* (2013.01)
*H01G 11/14* (2013.01)
*H01G 11/78* (2013.01)

(52) U.S. Cl.
CPC .............. *H01G 11/12* (2013.01); *H01G 11/14* (2013.01); *H01G 11/78* (2013.01)

(56) References Cited

U.S. PATENT DOCUMENTS

| | | |
|---|---|---|
| 2003/0142457 A1 | 7/2003 | Eriksson et al. |
| 2004/0100756 A1 | 5/2004 | Koizumi et al. |
| 2009/0246612 A1 | 10/2009 | Naoi et al. |
| 2011/0235242 A1 | 9/2011 | Oh et al. |
| 2012/0225345 A1 | 9/2012 | Kim |
| 2013/0182371 A1 | 7/2013 | Lee et al. |
| 2014/0050958 A1 | 2/2014 | Kwon et al. |
| 2014/0234682 A1 | 8/2014 | Kwon et al. |
| 2015/0221988 A1 | 8/2015 | Kwon et al. |

FOREIGN PATENT DOCUMENTS

| | | |
|---|---|---|
| CN | 104081575 A | 10/2014 |
| CN | 108022757 A | 5/2018 |
| JP | H1126321 A | 1/1999 |
| JP | 2004179621 A | 6/2004 |
| JP | 2005353722 A | 12/2005 |
| JP | 2015082640 A | 4/2015 |
| JP | 2016100578 A | 5/2016 |
| KR | 20000075011 A | 12/2000 |
| KR | 20110107035 A | 9/2011 |
| KR | 101163053 B1 | 7/2012 |
| KR | 20130085572 A | 7/2013 |
| KR | 20130132230 A | 12/2013 |
| KR | 101387424 B1 | 4/2014 |
| KR | 20140044019 A | 4/2014 |
| KR | 20150009306 A | 1/2015 |
| KR | 20170021000 A | 2/2017 |

OTHER PUBLICATIONS

Search Report from Office Action for Chinese Application No. 201980006707.4 dated May 18, 2021; 2 pages.

* cited by examiner

ELECTROCHEMICAL CAPACITOR AND METHOD OF MANUFACTURING THE SAME

CROSS-REFERENCE TO RELATED APPLICATIONS

The present application is a national phase entry under 35 U.S.C. § 371 of International Application No. PCT/KR2019/008498 filed Jul. 10, 2019, published in Korean, which claims priority from Korean Patent Application 10-2018-0080098 filed Jul. 10, 2018, all of which are incorporated herein by reference.

TECHNICAL FIELD

The present disclosure relates to an electrochemical capacitor and a method of manufacturing the electrochemical capacitor, and more particularly, to an electrochemical capacitor having an enhanced life span by suppressing degradation and a method of manufacturing the electrochemical capacitor.

BACKGROUND ART

An electrochemical capacitor is one of main devices for storing energy and is also called various other terms such as a super capacitor, an ultra-capacitor and an electric double layer capacitor.

The electrochemical capacitor is applied to more and more fields due to characteristics such as high output, high capacity and long life. In recent years, the electrochemical capacitor is applied to more fields of not only small electronic devices but also industrial devices, uninterruptible power supply (UPS), electric vehicles and smart grids.

Generally, the electrochemical capacitor includes a positive electrode and a negative electrode, which are formed by coating an active material layer on the surface of a current collector, a separator positioned between the positive electrode and the negative electrode to electrically insulate the positive electrode and the negative electrode and allow the transfer of ions, an electrolytic solution impregnated with the electrode and the separator to supply ions and enable the conduction of ions, and a case for accommodating the positive electrode, the negative electrode, the separator and the electrolytic solution therein.

Representatively, the electrochemical capacitor may be fabricated by winding and stacking a plurality of electrodes and a separator in a cylindrical shape to form an electrode assembly, then accommodating the formed electrode assembly in a case, injecting an electrolytic solution into the case, and sealing the case.

The electrochemical capacitor is evaluated as being useable for a long time compared with other energy storage devices. However, the performance of the electrochemical capacitor may also be deteriorated as being used longer.

In particular, in the electrochemical capacitor, the electrode assembly is in a wound form like a roll, namely in a roll type. However, if the electrochemical capacitor in which the electrode assembly is formed in a roll type as above is exposed to high temperature generated as repeating the charge and discharge cycles, the performance may degraded and the life span may be shortened.

SUMMARY

Technical Problem

The present disclosure is designed to solve the problems of the related art, and therefore the present disclosure is directed to providing an electrochemical capacitor, which may have an enhanced life span by increasing a heat dissipating amount to prevent the rise of an internal temperature.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided an electrochemical capacitor, comprising: a plurality of electrode assemblies, each electrode assembly including a positive electrode configured in a rolled sheet form and having both surfaces coated with a first active material layer, a negative electrode configured in a rolled sheet form to face the positive electrode and having both surfaces coated with a second active material layer, and a separator interposed and rolled between the positive electrode and the negative electrode; a positive electrode lead wire electrically connected to the positive electrode of each of the plurality of electrode assemblies; and a negative electrode lead wire electrically connected to the negative electrode of each of the plurality of electrode assemblies.

Preferably, the plurality of electrode assemblies may be stacked in one direction such that the positive electrodes, the negative electrodes and the separators of neighboring electrode assemblies have different numbers of winds.

Preferably, the plurality of electrode assemblies may alternate a first number of winds and a second number of winds along the one direction.

Preferably, the plurality of electrode assemblies may be a difference between the first number of winds and the second number of winds is selected according to a thickness of the positive electrodes, the negative electrodes and the separators of the plurality of electrode assemblies.

Preferably, for a given electrode assembly, the positive electrode lead wire may be electrically connected to the positive electrode of the given electrode assembly such that a first distance from a point electrically connected to the positive electrode of the given electrode assembly to a core of the positive electrode of the given electrode assembly is smaller than a first minimum distance from a terminal of the positive electrode of the given electrode assembly to the core of the given electrode assembly when the given electrode assembly is rolled in a minimum number of winds.

Preferably, for a given electrode assembly, the negative electrode lead wire may be electrically connected to the negative electrode of the given electrode assembly such that a second distance from a point electrically connected to the negative electrode of the given electrode assembly to a core of the negative electrode of the given electrode assembly is smaller than a second minimum distance from a terminal of the negative electrode of the given electrode assembly to the core of the given electrode assembly when the given electrode assembly is rolled in a minimum number of winds.

Preferably, the electrochemical capacitor may further comprise a housing configured to accommodate the plurality of electrode assemblies therein, wherein the housing may include steps formed corresponding to an appearance of the plurality of electrode assemblies having different numbers of winds.

In another aspect of the present disclosure, there is also provided a method of manufacturing an electrochemical capacitor, comprising: rolling a plurality of electrode assemblies from cores thereof, each electrode assembly including a positive electrode configured in a rolled sheet form, a negative electrode configured in a rolled sheet form to face the positive electrode, and a separator interposed between the positive electrode and the negative electrode; electrically connecting a positive electrode lead wire to the positive electrode of each of the plurality of electrode assemblies and electrically connecting a negative electrode lead wire to the negative electrode of each of the plurality of electrode assemblies; and accommodating the plurality of electrode assemblies in a housing.

Preferably, rolling the plurality of electrode assemblies results in the positive electrodes, the negative electrodes and the separators of neighboring electrode assemblies having different numbers of winds.

Preferably, electrically connecting the positive electrode lead wire to the positive electrode of each of the plurality of electrode assemblies may include, for a given electrode assembly, electrically connecting the positive electrode lead wire to the positive electrode of the given electrode assembly such that a first distance from a point electrically connected to the positive electrode of the given electrode assembly to a core of the positive electrode of the given electrode assembly is smaller than a first minimum distance from a terminal of the positive electrode of the given electrode assembly to the core of the given electrode assembly when the given electrode assembly is rolled in a minimum number of winds.

Preferably, electrically connecting the negative electrode lead wire to the negative electrode of each of the plurality of electrode assemblies comprises, for a given electrode assembly, electrically connecting the negative electrode lead wire to the negative electrode of the given electrode assembly such that a second distance from a point electrically connected to the negative electrode of the given electrode assembly to a core of the negative electrode is smaller than a second minimum distance from a terminal of the negative electrode of the given electrode assembly to the core of the given electrode assembly when the given electrode assembly is rolled in a minimum number of winds.

Advantageous Effects

According to an embodiment of the present disclosure, the performance of the electrochemical capacitor may be improved further.

In particular, according to an embodiment of the present disclosure, it is possible to prevent or minimize degradation of various components such as a positive electrode, a negative electrode and a separator included in the electrochemical capacitors. Moreover, according to the present disclosure, in a roll-type electrochemical capacitor including a positive electrode, a negative electrode and a separator, a surface area of the electrochemical capacitor is increased to improve the heat dissipating amount, thereby preventing the electrochemical capacitor from being overheated.

Thus, according to the above embodiments of the present disclosure, the performance of the electrochemical capacitor may be stably maintained for a long time and the life span may be enhanced.

In addition, the present disclosure may have various other effects, and other effects of the present disclosure may be understood by the following description and more clearly understood by embodiments of the present disclosure.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
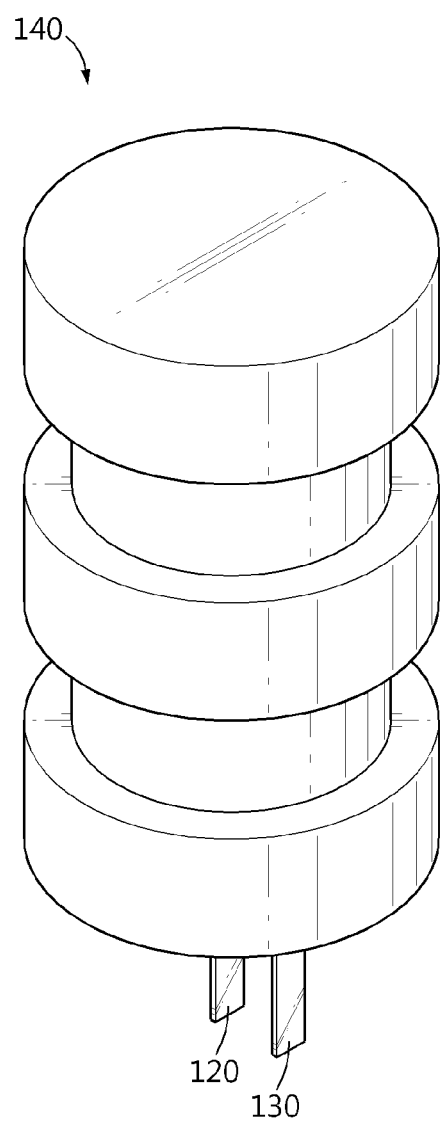
FIG. 1 is a perspective view schematically showing an electrochemical capacitor according to an embodiment of the present disclosure.
Figure 2:
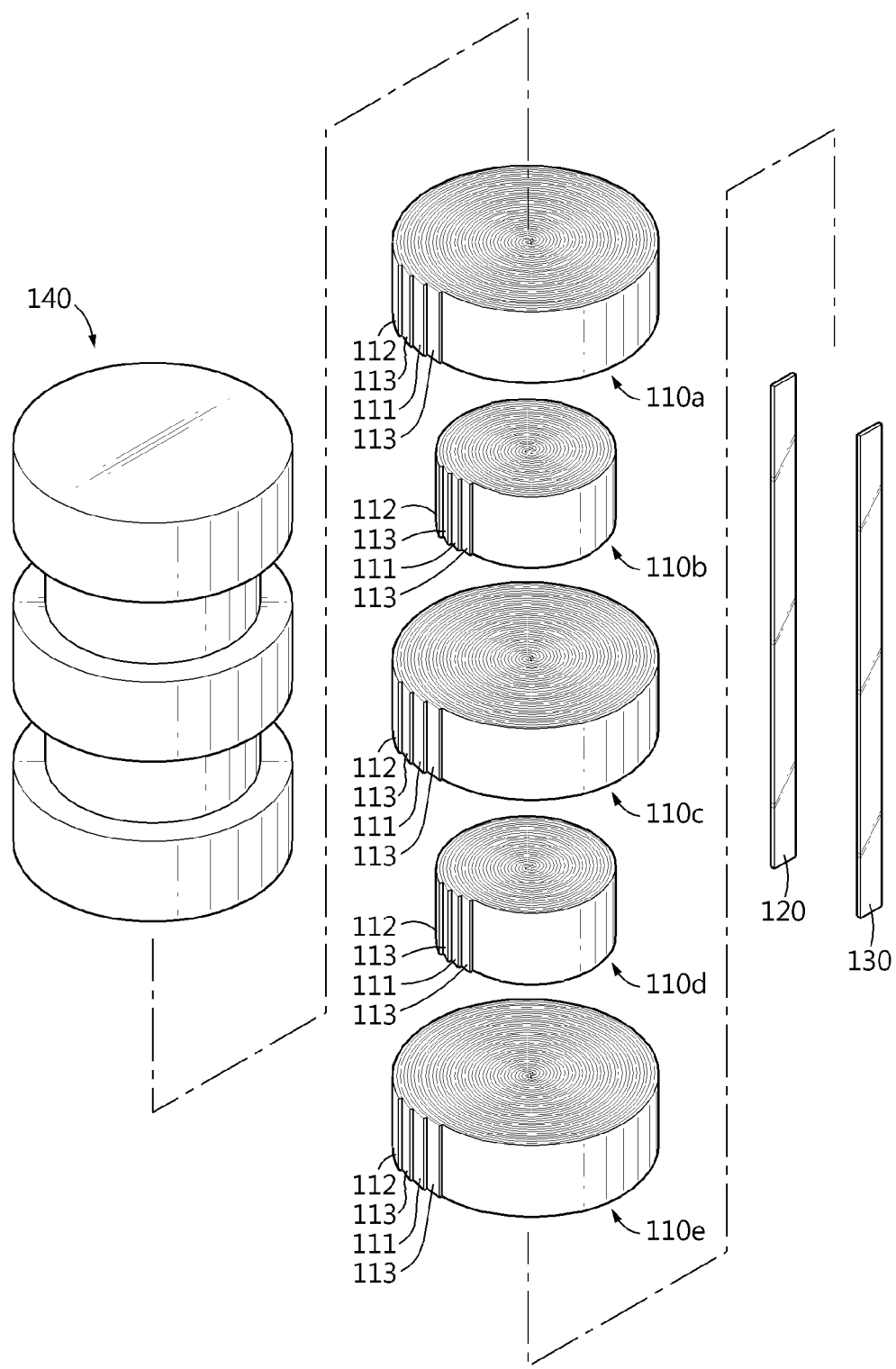
FIG. 2 is an exploded perspective view schematically showing components of the electrochemical capacitor according to an embodiment of the present disclosure.

FIG. 1 is a perspective view schematically showing an electrochemical capacitor according to an embodiment of the present disclosure, and FIG. 2 is an exploded perspective view schematically showing components of the electrochemical capacitor according to an embodiment of the present disclosure.

Referring to FIGS. 1 and 2, the electrochemical capacitor according to the present disclosure includes a plurality of electrode assemblies 110a, 110b, 110c, 110d, 110e, a positive electrode lead wire 120, a negative electrode lead wire 130 and a housing 140.

Each of the plurality of electrode assemblies 110a, 110b, 110c, 110d, 110e includes a positive electrode 111, a negative electrode 112 and a separator 113.

The positive electrode 111 may have a sheet form, namely a plate shape with a large surface. In addition, the positive electrode 111 of the sheet form may have a rolled shape. That is, as shown in the figure, the positive electrode 111 may be rolled in one direction to form a roll shape.

The positive electrode 111 may be coated with an active material layer on a surface thereof. More specifically, the positive electrode 111 may include a current collector and an active material layer. Here, the current collector is made of an electrically conductive material such as a metal to serve as a path for transferring charges and may have a sheet form. In addition, the active material layer may be formed on the surface of the current collector of a sheet form, especially on both surfaces thereof. The active material layer may include an active material such as activated carbon, a conductive material, a binder, and the like.

The negative electrode 112 may function as an electrode plate having a polarity opposite to that of the positive electrode 111. The negative electrode 112 may have a rolled sheet form. Also, the negative electrode 112 may have a current collector and an active material layer coated on a surface thereof.

The negative electrode 112 may be configured to face the positive electrode 111. That is, the negative electrode 112 may be rolled together with the positive electrode 111 in a state where the surface of the negative electrode 112 overlaps with the surface of the positive electrode 111, so that the negative electrode 112 faces the positive electrode 111 from a core to a terminal. Here, the core refers to an end portion at the center in a length direction when the negative electrode 112 is rolled. Also, the terminal refers to an end portion of the outer side in a length direction when the negative electrode 112 is rolled. In this configuration, since the positive electrode 111 and the negative electrode 112 are rolled together, both surfaces of the positive electrode 111 and the negative electrode 112 may face each other, except for an innermost portion and an outermost portion. That is, both the inner surface and the outer surface of the positive electrode 111 may face the negative electrode 112, except for an innermost layer located at an innermost side. In addition, both the inner surface and the outer surface of the negative electrode 112 may face the positive electrode 111, except for an outermost layer located at an outermost side.

The negative electrode 112 may be located at an outer side of the positive electrode 111. That is, when the positive electrode 111 and the negative electrode 112 are rolled together, the negative electrode 112 may be regarded as being rolled at the outer side of the positive electrode 111. The core of the negative electrode 112 may be located at an outer side of the core of the positive electrode 111. For example, when the electrochemical capacitor is configured in a cylindrical shape, an inner end of the positive electrode 111 may be located closer to the central axis of the cylinder than an inner end of the negative electrode 112.

The separator 113 may be interposed between the positive electrode 111 and the negative electrode 112. The separator 113 may prevent the positive electrode 111 and the negative electrode 112 from directly contacting each other to prohibit a short circuit and allow ions to move therebetween. For this purpose, the separator 113 may have a thin and flat sheet form, similar to the positive electrode 111 and the negative electrode 112, and be rolled together with the positive electrode 111 and the negative electrode 112 between the positive electrode 111 and the negative electrode 112.

In the present disclosure, the positive electrode 111, the negative electrode 112 and the separator 113 are not limited to any particular materials. That is, in the present disclosure, various kinds of electrode and separator materials known in the art at the time of filing of this application may be employed as the materials of the positive electrode 111, the negative electrode 112 and the separator 113.

The plurality of electrode assemblies 110a, 110b, 110c, 110d, 110e may be stacked in one direction. More specifically, as shown in FIG. 2, the plurality of electrode assemblies 110a, 110b, 110c, 110d, 110e may be stacked such that their centers are located on the same line. That is, the plurality of electrode assemblies 110a, 110b, 110c, 110d, 110e may be stacked such that their cores are located on the same line.

Hereinafter, differences between the plurality of electrode assemblies 110a, 110b, 110c, 110d, 110e will be described.

Figure 3:
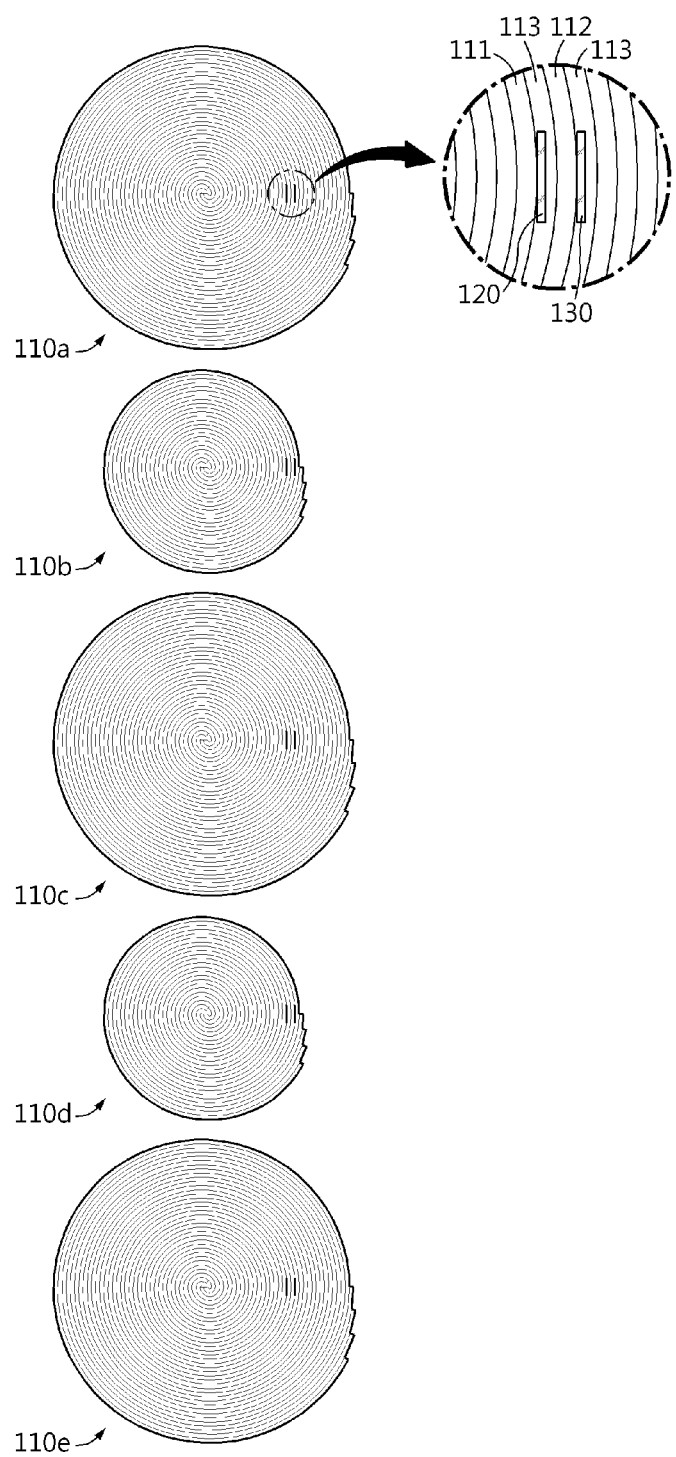
FIG. 3 is a cross-sectioned view showing sections of a plurality of electrode assemblies, employed at the electrochemical capacitor according to an embodiment of the present disclosure.

FIG. 3 is a cross-sectioned view showing sections of the plurality of electrode assemblies 110a, 110b, 110c, 110d, 110e, employed at the electrochemical capacitor according to an embodiment of the present disclosure.

Referring to FIG. 3 further, each of the plurality of electrode assemblies 110a, 110b, 110c, 110d, 110e includes a positive electrode 111, a negative electrode 112, and a separator 113. However, the plurality of electrode assemblies 110a, 110b, 110c, 110d, 110e may be formed such that the positive electrodes 111, the negative electrodes 112, and the separators 113 of neighboring electrode assemblies have different numbers of winds.

More specifically, in the plurality of electrode assemblies 110a, 110b, 110c, 110d, 110e, the number of winds of the positive electrode 111, the negative electrode 112 and the separator 113 of an electrode assembly 110a, 110c, 110e located in an odd-number layer may be a first number of winds, and the number of winds of the positive electrode 111, the negative electrode 112 and the separator 113 of an electrode assembly 110b, 110d located in an even-number layer may be a second number of winds. Here, the first number of winds and the second number of winds may be different.

That is, the electrode assemblies 110a, 110c, 110e located in the odd-number layers may be rolled in the same first number of winds, respectively, so that distances from the cores thereof to the outermost side may be identical.

In addition, the electrode assemblies 110b, 110d located in the even-number layers may be rolled in the same second number of winds, respectively, so that distances from the cores thereof to the outermost side may be identical.

However, the electrode assemblies 110a, 110c, 110e located in the odd-number layers and the electrode assemblies 110b, 110d located in the even-number layers may be rolled in different numbers of winds, so that distances from the cores thereof to the outermost side may be different.

At this time, the difference in a number of winds between the first number of winds and the second number of winds may be a reference number of winds set corresponding to the thicknesses of the positive electrode 111, the negative electrode 112 and the separator 113.

More specifically, if the electrode assembly is rolled one time, the distance from the core to the outermost side may be equal to the thicknesses of the positive electrode 111, the negative electrode 112 and the separator 113. Further, if the electrode assembly is rolled n times, the distance from the core to the outermost side may be equal to the thickness of the positive electrode 111, the negative electrode 112 and the separator 113 overlapped n times. That is, the distance from the core of the electrode assembly to the outermost side may be proportional to the number of winds and the thicknesses of the positive electrode 111, the negative electrode 112 and the separator 113.

Using this, in the plurality of electrode assemblies 110a, 110b, 110c, 110d, 110e, the electrode assemblies 110a, 110c, 110e located in the odd-numbered layers may be rolled in the first number of winds and the electrode assemblies 110b, 110d located in the even-number layers may be rolled in the second number of winds, which is smaller than the first number of winds by the reference number of winds, such that a step of a predetermined length or above is generated between neighboring electrode assemblies to increase the surface area.

At this time, the reference number of winds may be a number of winds set such that a difference between the distance from the core of the electrode assembly 110a, 110c, 110e located in the odd-number layer to the outermost side and the distance from the core of the electrode assembly 110b, 110d located in the even-number layer to the outermost side corresponds to a predesigned difference.

For example, if the distance from the core of the electrode assembly rolled one time to the outermost side is 0.1 mm and a predesigned difference between the distance from the core of the electrode assembly 110a, 110c, 110e located in the odd-number layer to the outermost side and the distance from the core of the electrode assembly 110b, 110d located in the even-number layer to the outermost side is 1.0 mm, the reference number of winds may be set as 10, which is the number of winds corresponding to 1.0 mm.

Accordingly, the difference in a number of winds between the first number of winds and the second number of winds may be the reference number of winds that is 10. To this end, the electrode assemblies 110a, 110c, 110e located in the odd-number layers may be formed to have a greater spread length than the electrode assemblies 110b, 110d located in the even-number layers by a length corresponding to the reference number of winds before being rolled, such that the electrode assemblies 110a, 110c, 110e located in the odd-number layers are rolled more than the electrode assemblies 110b, 110d located in the even-number layers by the reference number of winds.

Thus, as shown in FIG. 2, a step is generated between the plurality of electrode assemblies 110a, 110b, 110c, 110d, 110e to increase the surface area of the outermost side thereof. As the surface area of the outermost side of the electrode assembly increases, the heat dissipating amount may increase. That is, heat may be emitted from the exposed portions such as the upper and lower surfaces as well as the side surfaces of the plurality of electrode assemblies 110a, 110b, 110c, 110d, 110e. Thus, according to the configuration of the present disclosure, the surface area of the plurality of electrode assemblies 110a, 110b, 110c, 110d, 110e, which exchanges heat with the outside, increases, thereby improving the heat dissipating performance.

Hereinafter, the surface area of an assembly where the plurality of electrode assemblies 110a, 110b, 110c, 110d, 110e of the present disclosure are connected and that of an assembly of a general cylindrical shape will be compared.

For example, in the embodiment of FIG. 2, it is assumed that the height of the plurality of connected electrode assemblies 110a, 110b, 110c, 110d, 110e is H. In this case, the outer surface of an A assembly where the plurality of electrode assemblies 110a, 110b, 110c, 110d, 110e are connected may be greater than the outer surface of a B assembly (a cylindrical assembly) where only electrode assemblies 110a, 110c, 110e in the odd-number layers are connected to the height H under a predetermined condition. In this case, the B assembly may have a cylindrical assembly including five odd-number layer electrode assemblies 110a, 110c, 110e of the present disclosure.

Here, it is assumed that the number of the plurality of electrode assemblies included in the A assembly and the B assembly is n, the radius of the odd-number layer electrode assembly of the A assembly and the B assembly is R1, and the radius of the even-number layer electrode assembly of the A assembly is R2. In this case, the predetermined condition means a condition in which the height H of the A assembly and the B assembly is smaller than "n×(R1+R2)" and greater than "0". Since the predetermined condition for the height H can be calculated by a formula for obtaining the outer surface of a cylinder, the process of obtaining the predetermined condition will be not be described in detail.

Thus, the electrochemical capacitor of the present disclosure may be formed such that its outer surface is greater than that of a general cylindrical capacitor while the amount of the positive electrode 111, the negative electrode 112 and the separator 113 included therein is smaller than the amount of the positive electrode, the negative electrode and the separator included in the general cylindrical capacitor.

That is, the electrochemical capacitor of the present disclosure may be formed to have the maximum surface area by using the positive electrode 111, the negative electrode 112 and the separator 113 included therein. Thus, the electrochemical capacitor of the present disclosure may have improved heat dissipation efficiency compared to the general cylindrical capacitor, thereby stably keeping the performance for a long time and increasing the life span.

Figure 4:
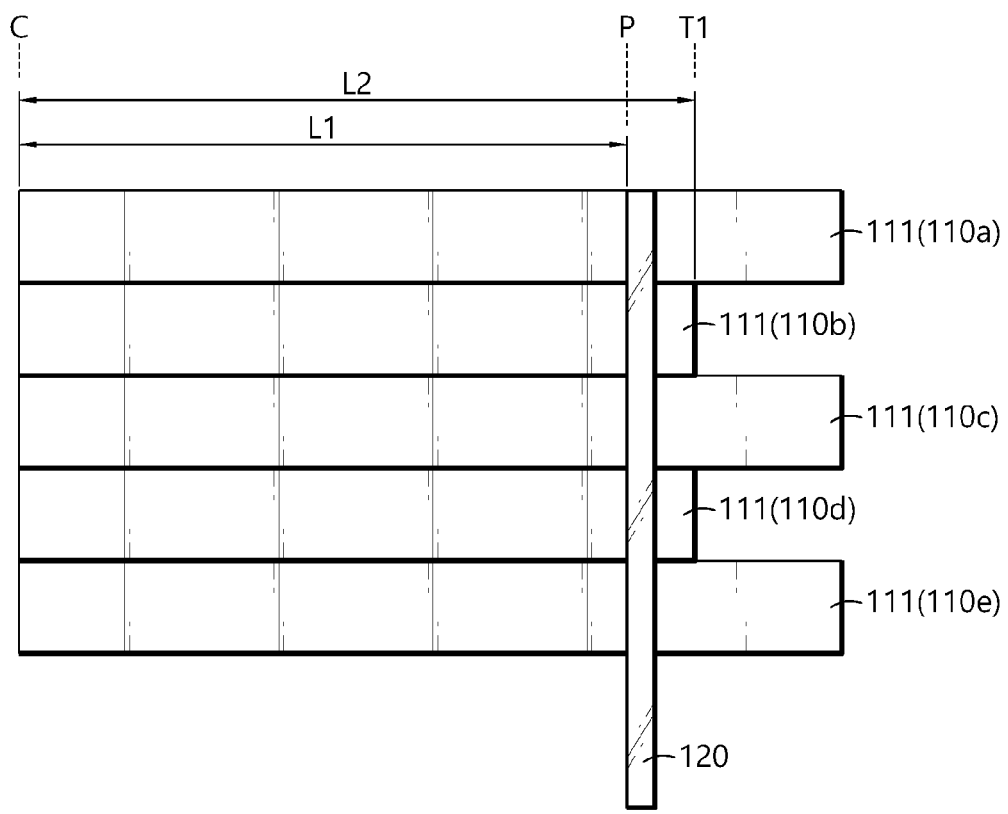
FIG. 4 is a diagram showing positive electrodes provided to the plurality of electrode assemblies, employed at the electrochemical capacitor according to an embodiment of the present disclosure, before being wound.

FIG. 4 is a diagram showing the positive electrodes 111 provided to the plurality of electrode assemblies 110a, 110b, 110c, 110d, 110e, employed at the electrochemical capacitor according to an embodiment of the present disclosure, before being wound.

Referring to FIG. 4 further, the positive electrode lead wire 120 may be electrically connected to the positive electrodes 111 of the plurality of electrode assemblies 110a, 110b, 110c, 110d, 110e, respectively.

At this time, the positive electrode lead wire 120 may be electrically connected to the positive electrode 111 at a position spaced apart by a first distance L1 from the core C of the positive electrode 111. That is, the point P at which the positive electrode lead wire 120 is connected to the positive electrode 111 may be spaced apart by the first distance L1 from the core C of the positive electrode 111. In addition, the first distance L1 may be smaller than a first minimum distance L2 from a terminal T1 of the positive electrode 111 rolled in a minimum number of winds to the core C.

That is, the positive electrode lead wire 120 may electrically connect to the positive electrodes 111 of the plurality of electrode assemblies 110a, 110b, 110c, 110d, 110e, which are electrically separated. In addition, the positive electrode lead wire 120 may be provided such that the points P electrically connected to the positive electrodes 111 are arranged in a vertical direction between the terminals T1 of the positive electrodes 111 rolled in a minimum number of winds and the core C.

Meanwhile, the positive electrode lead wire 120 may be electrically connected to the positive electrodes 111 of the plurality of electrode assemblies 110a, 110b, 110c, 110d, 110e, respectively, and be made of a conductive material to charge and discharge the electrochemical capacitor. Preferably, the present disclosure is not limited to specific materials with respect to the positive electrode lead wire 120. That is, in the present disclosure, the material of the positive electrode lead wire 120 may adopt various kinds of lead wire materials known in the art at the time of filing of this application.

Figure 5:
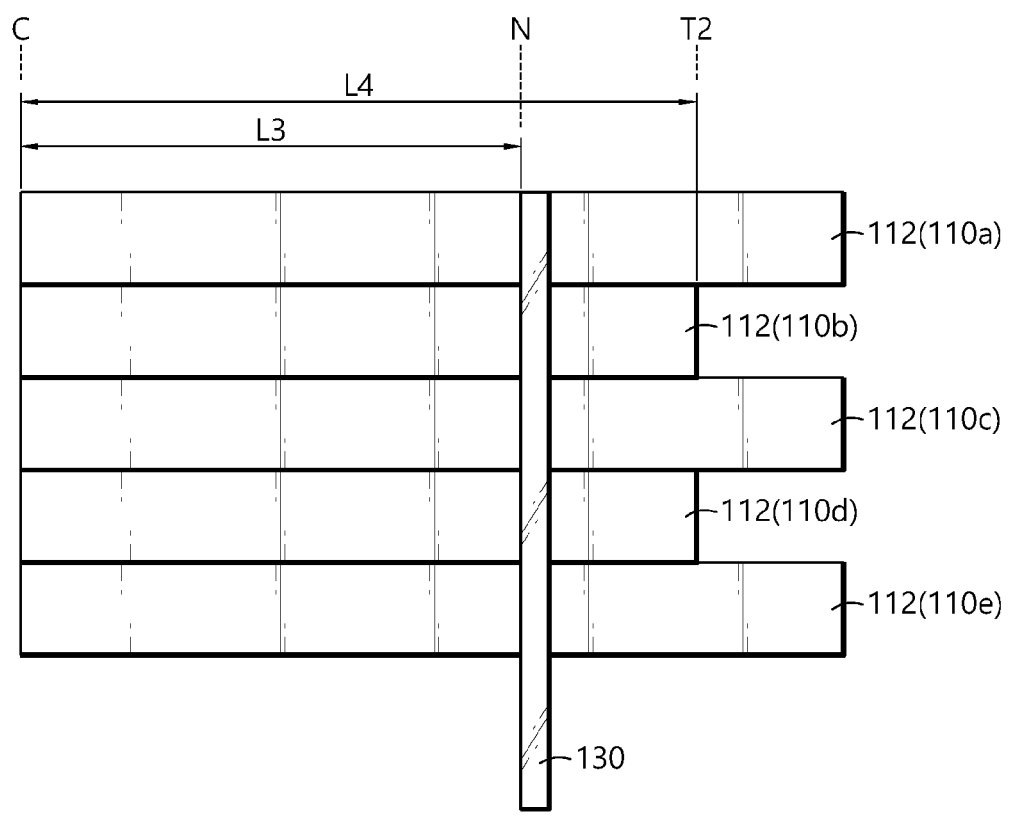
FIG. 5 is a diagram showing negative electrodes provided to the plurality of electrode assemblies, employed at the electrochemical capacitor according to an embodiment of the present disclosure, before being wound.

FIG. 5 is a diagram showing the negative electrodes 112 provided to the plurality of electrode assemblies 110a, 110b, 110c, 110d, 110e, employed at the electrochemical capacitor according to an embodiment of the present disclosure, before being wound.

Referring to FIG. 5 further, the negative electrode lead wire 130 may be electrically connected to the negative electrodes 112 of the plurality of electrode assemblies 110a, 110b, 110c, 110d, 110e, respectively.

At this time, the negative electrode lead wire 130 may be electrically connected to the negative electrode 112 at a position spaced apart by a second distance L3 from the core C of the negative electrode 112. That is, the point N where the negative electrode lead wire 130 is connected to the negative electrode 112 may be spaced apart by the second distance L3 from the core C of the negative electrode 112. In addition, the second distance L3 may be smaller than a second minimum distance L4 from a terminal T2 of the negative electrode 112 rolled in a minimum number of winds to the core C.

That is, the negative electrode lead wire 130 may electrically connect to the negative electrodes 112 of the plurality of electrode assemblies 110a, 110b, 110c, 110d, 110e, which are electrically separated from each other. In addition, the negative electrode lead wire 130 may be provided such that the points N electrically connected to the negative electrodes 112, respectively, are arranged in a vertical direction between the terminals T2 of the negative electrodes 112 rolled in a minimum number of winds and the core C.

Meanwhile, the negative electrode lead wire 130 may be electrically connected to the negative electrodes 112 of the plurality of electrode assemblies 110a, 110b, 110c, 110d, 110e, respectively, so as not to be electrically connected to the positive electrode lead wire 120.

Meanwhile, the negative electrode lead wire 130 may be electrically connected to the negative electrodes 112 of the plurality of electrode assemblies 110a, 110b, 110c, 110d, 110e, respectively, and be made of a conductive material to charge and discharge the electrochemical capacitor. Preferably, the present disclosure is not limited to specific materials with respect to the negative electrode lead wire 130. That is, in the present disclosure, the material of the negative electrode lead wire 130 may adopt various kinds of lead wire materials known in the art at the time of filing of this application.

The housing 140 may have an empty space therein to accommodate the plurality of electrode assemblies 110a, 110b, 110c, 110d, 110e including the positive electrodes 111, the negative electrodes 112 and the separators 113.

In addition, the housing 140 may accommodate the positive electrode lead wire 120 and the negative electrode lead wire 130 in the empty space thereof. At this time, only a portion of the positive electrode lead wire 120 and the negative electrode lead wire 130 may be accommodated in the housing 140, and a remaining portion thereof may be exposed out of the housing 140. More specifically, the housing 140 may accommodate only a portion of the positive electrode lead wire 120 electrically connected to the positive electrodes 111 of the plurality of electrode assemblies 110a, 110b, 110c, 110d, 110e, respectively, and accommodate only a portion of the negative electrode lead wires 130 electrically connected to the negative electrodes 112 of the plurality of electrode assemblies 110a, 110b, 110c, 110d, 110e, respectively.

In addition, the housing 140 may further accommodate an electrolytic solution. Here, the electrolytic solution may contain an electrolyte serving as a salt component and an organic solvent.

The electrolyte may include at least one kind of anion such as $Br^-$, $BF_4^-$, $PF_6^-$ and $TFSI^-$, and at least one kind of cation with a quaternary ammonium structure such as spiro-(1,1')-bipyrrolidinium, piperidine-1-spiro-1'-pyrrolidinium, spiro-(1,1')-bipiperidinium, dialkylpyrrolidinium, dialkylimidazolium, dialkylpyrridinium, tetra-alkylammonium, dialkylpiperidinium, tetra-alkylphosphonium, and the like. A non-lithium salt that do not contain lithium may be used as the electrolyte.

In addition, the organic solvent used in the electrolytic solution may include at least one selected from the group consisting of propylene carbonate (PC), diethyl carbonate, ethylene carbonate (EC), sulfolane, acetonitrile, dimethoxyethane, tetrahydrofuran and ethyl methyl carbonate (EMC).

However, the present disclosure is not limited to any particular material of the electrolytic solution, and various electrolytic solutions known in the art at the time of filing of this application may be employed as the electrolytic solution in the capacitor of the present disclosure.

The housing 140 may be made of a metal material or a polymer material and be sealed to prevent leakage of the electrolytic solution.

As shown in FIG. 1, the housing 140 may have a step formed corresponding to the appearance of the plurality of electrode assemblies having different numbers of winds. Thus, the housing 140 may have an increased surface area of the outermost side. According to this configuration, the housing 140 may quickly emit the heat generated from the plurality of electrode assemblies 110a, 110b, 110c, 110d, 110e provided in the inner empty space thereof, thereby preventing the internal temperature from rising.

Hereinafter, a method of manufacturing an electrochemical capacitor according to an embodiment of the present disclosure will be described.

Figure 6:
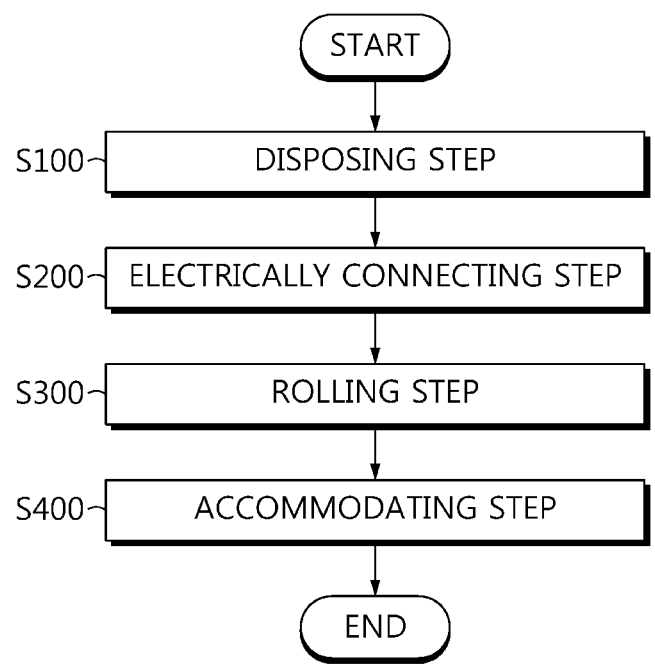
FIG. 6 is a flowchart for illustrating a method of manufacturing an electrochemical capacitor according to an embodiment of the present disclosure.

FIG. 6 is a flowchart for illustrating a method of manufacturing an electrochemical capacitor according to an embodiment of the present disclosure.

Referring to FIG. 6, the method of manufacturing an electrochemical capacitor according to an embodiment of the present disclosure includes the steps of disposing a plurality of electrode assemblies, each including a positive electrode configured in a rolled sheet form, a negative electrode configured in a rolled sheet form to face the positive electrode, and a separator interposed between the positive electrode and the negative electrode (S100), electrically connecting a positive electrode lead wire to the positive electrode of each of the plurality of electrode assemblies and electrically connecting a negative electrode lead wire to the negative electrode of each of the plurality of electrode assemblies (S200), rolling the plurality of electrode assemblies from cores thereof (S300), and accommodating the plurality of electrode assemblies in a housing (S400).

The disposing step (S100) may include a step of disposing the positive electrodes, the negative electrodes and the separators of neighboring electrode assemblies to have different numbers of winds.

More specifically, in the disposing step (S100), the positive electrode, the negative electrode and the separator included in the electrode assembly may be stacked in the order of the negative electrode, the separator and the positive electrode.

After that, the disposing step (S100) may include the step of disposing the plurality of electrode assemblies in a state before being rolled such that sheet lengths from the core of the electrode assembly in a state before being rolled to the terminals are different between neighboring electrode assemblies.

For example, in the disposing step (S100), the plurality of electrode assemblies may be arranged such that the sheet length of the electrode assembly positioned in the odd-number layer is longer than the sheet length of the electrode assembly positioned in the even-number layer.

In addition, the disposing step (S100) may include the step of disposing the plurality of electrode assemblies such that the cores of the plurality of electrode assemblies are located at the same point in the vertical direction.

After that, in the electrically connecting step (S200), the positive electrode lead wire may be electrically connected to the positive electrodes of the plurality of disposed electrode assemblies, respectively, and the negative electrode lead wire may be electrically connected to the negative electrodes of the plurality of disposed electrode assemblies, respectively.

More specifically, the electrically connecting step (S200) may include the step of electrically connecting the positive electrode lead wire to the positive electrode such that a first distance from a point electrically connected to the positive electrode to a core of the positive electrode is smaller than a first minimum distance from a terminal of the positive electrode rolled in a minimum number of winds to the core.

In addition, the electrically connecting step (S200) may further include the step of electrically connecting the negative electrode lead wire to the negative electrode such that a second distance from a point electrically connected to the negative electrode to a core of the negative electrode is smaller than a second minimum distance from a terminal of the negative electrode rolled in a minimum number of winds to the core.

In the rolling step (S300), the plurality of disposed electrode assemblies may be rolled from the cores thereof. At this time, the plurality of electrode assemblies may have different numbers of winds according to the sheet lengths of the plurality of electrode assemblies. That is, as the sheet length of the electrode assembly is shorter, the number of winds may be smaller. Accordingly, a step may be formed at the outermost of the plurality of rolled electrode assemblies, thereby increasing the surface area of the plurality of rolled electrode assemblies in comparison to a conventional electrode assembly of a cylindrical shape.

In the accommodating step (S400), the plurality of rolled electrode assemblies may be accommodated in the housing. More specifically, the accommodating step (S400) may include the steps of accommodating the plurality of electrode assemblies having a step formed at the outermost side thereof in the cylindrical housing and pressing the housing inward from the outside to form a step, similar to the outermost side of the plurality of electrode assemblies.

After that, the accommodating step (S400) may further include the step of putting an electrolytic solution into the housing and sealing the housing so that the electrolytic solution is not leaked out.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE NUMERALS 110a, 110b, 110c, 110d, 110e: electrode assembly
111: positive electrode
112: negative electrode
113: separator
120: positive electrode lead wire
130: negative electrode lead wire
140: housing

What is claimed is:

1. An electrochemical capacitor, comprising:
a plurality of electrode assemblies, each electrode assembly including a positive electrode configured in a rolled sheet form and having both surfaces coated with a first active material layer, a negative electrode configured in a rolled sheet form to face the positive electrode and having both surfaces coated with a second active material layer, and a separator interposed and rolled between the positive electrode and the negative electrode;
a positive electrode lead wire electrically connected to the positive electrode of each of the plurality of electrode assemblies; and
a negative electrode lead wire electrically connected to the negative electrode of each of the plurality of electrode assemblies,
wherein the plurality of electrode assemblies are stacked in one direction such that the positive electrodes, the negative electrodes and the separators of neighboring electrode assemblies have different numbers of winds.

2. The electrochemical capacitor according to claim 1, wherein the plurality of electrode assemblies alternate between a first number of winds and a second number of winds along the one direction.

3. The electrochemical capacitor according to claim 2, wherein a difference between the first number of winds and the second number of winds is selected according to a thickness of the positive electrodes, the negative electrodes and the separators of the plurality of electrode assemblies.

4. The electrochemical capacitor according to claim 1, wherein, for a given electrode assembly, the positive electrode lead wire is electrically connected to the positive electrode of the given electrode assembly such that a first distance from a point electrically connected to the positive electrode of the given electrode assembly to a core of the positive electrode of the given electrode assembly is smaller than a first minimum distance from a terminal of the positive electrode of the given electrode assembly to the core of the given electrode assembly when the given electrode assembly is rolled in a minimum number of winds.

5. The electrochemical capacitor according to claim 1, wherein, for a given electrode assembly, the negative electrode lead wire is electrically connected to the negative electrode of the given electrode assembly such that a second distance from a point electrically connected to the negative electrode of the given electrode assembly to a core of the negative electrode of the given electrode assembly is smaller than a second minimum distance from a terminal of the negative electrode of the given electrode assembly to the core of the given electrode assembly when the given electrode assembly is rolled in a minimum number of winds.

6. The electrochemical capacitor according to claim 1, further comprising:
a housing configured to accommodate the plurality of electrode assemblies therein, wherein the housing includes steps formed corresponding to an appearance of the plurality of electrode assemblies having different numbers of winds.

7. A method of manufacturing an electrochemical capacitor, comprising:
- rolling a plurality of electrode assemblies from cores thereof, each electrode assembly wound radially around a primary axis, each electrode assembly including a positive electrode configured in a rolled sheet form, a negative electrode configured in a rolled sheet form to face the positive electrode, and a separator interposed between the positive electrode and the negative electrode;
- aligning the plurality of electrode assemblies along the primary axis;
- electrically connecting a positive electrode lead wire to the positive electrode of each of the plurality of electrode assemblies and electrically connecting a negative electrode lead wire to the negative electrode of each of the plurality of electrode assemblies; and
- accommodating the plurality of electrode assemblies in a housing.

8. The method of manufacturing an electrochemical capacitor according to claim 7
- wherein rolling the plurality of electrode assemblies results in the positive electrodes, the negative electrodes and the separators of neighboring electrode assemblies having different numbers of winds.

9. The method of manufacturing an electrochemical capacitor according to claim 7
- wherein electrically connecting the positive electrode lead wire to the positive electrode of each of the plurality of electrode assemblies comprises, for a given electrode assembly, electrically connecting the positive electrode lead wire to the positive electrode of the given electrode assembly such that a first distance from a point electrically connected to the positive electrode of the given electrode assembly to a core of the positive electrode of the given electrode assembly is smaller than a first minimum distance from a terminal of the positive electrode of the given electrode assembly to the core of the given electrode assembly when the given electrode assembly is rolled in a minimum number of winds.

10. The method of manufacturing an electrochemical capacitor according to claim 7
- wherein electrically connecting the negative electrode lead wire to the negative electrode of each of the plurality of electrode assemblies comprises, for a given electrode assembly, electrically connecting the negative electrode lead wire to the negative electrode of the given electrode assembly such that a second distance from a point electrically connected to the negative electrode of the given electrode assembly to a core of the negative electrode is smaller than a second minimum distance from a terminal of the negative electrode of the given electrode assembly to the core of the given electrode assembly when the given electrode assembly is rolled in a minimum number of winds.

11. A method of manufacturing an electrochemical capacitor, comprising:
- rolling a plurality of electrode assemblies from cores thereof, each electrode assembly including a positive electrode configured in a rolled sheet form, a negative electrode configured in a rolled sheet form to face the positive electrode, and a separator interposed between the positive electrode and the negative electrode;
- electrically connecting a positive electrode lead wire to the positive electrode of each of the plurality of electrode assemblies and electrically connecting a negative electrode lead wire to the negative electrode of each of the plurality of electrode assemblies; and
- accommodating the plurality of electrode assemblies in a housing, wherein rolling the plurality of electrode assemblies results in the positive electrodes, the negative electrodes and the separators of neighboring electrode assemblies having different numbers of winds.

* * * * *